(12) United States Patent
Ellwein

(10) Patent No.: US 10,061,635 B2
(45) Date of Patent: Aug. 28, 2018

(54) CYBER PHYSICAL SYSTEM

(71) Applicant: Kriwan Industrie-Elektronik GmbH, Forchtenberg (DE)

(72) Inventor: Christian Ellwein, Schwäbisch Hall (DE)

(73) Assignee: KRIWAN INDUSTRIE-ELEKTRONIK GMBH, Forchtenberg (DE)

( * ) Notice: Subject to any disclaimer, the term of this patent is extended or adjusted under 35 U.S.C. 154(b) by 88 days.

(21) Appl. No.: 15/349,120

(22) Filed: Nov. 11, 2016

(65) Prior Publication Data
US 2017/0139763 A1 May 18, 2017

(30) Foreign Application Priority Data
Nov. 13, 2015 (DE) .......................... 10 2015 119 597

(51) Int. Cl.
*G06F 11/07* (2006.01)
*H04L 12/28* (2006.01)
*H04L 29/06* (2006.01)

(52) U.S. Cl.
CPC ...... *G06F 11/0772* (2013.01); *G06F 11/0709* (2013.01); *G06F 11/0751* (2013.01); *H04L 12/2867* (2013.01); *H04L 63/04* (2013.01)

(58) Field of Classification Search
CPC .................... G06F 11/0772; G06F 11/0784
USPC ................................................ 714/57, 4.4
See application file for complete search history.

(56) References Cited

U.S. PATENT DOCUMENTS

| | | | |
|---|---|---|---|
| 9,928,366 B2* | 3/2018 | Ladnai | G06F 21/56 |
| 2002/0183598 A1* | 12/2002 | Teraura | A61B 5/0002 |
| | | | 600/300 |
| 2010/0299720 A1 | 11/2010 | John | |
| 2014/0329497 A1* | 11/2014 | Sanzgiri | H04W 12/06 |
| | | | 455/411 |
| 2015/0096026 A1* | 4/2015 | Kolacinski | G06F 21/55 |
| | | | 726/23 |
| 2016/0328571 A1* | 11/2016 | Duplys | H04L 63/10 |

(Continued)

FOREIGN PATENT DOCUMENTS

| | | |
|---|---|---|
| DE | 20 2009 005 437 U1 | 6/2009 |
| DE | 10 2013 105 781 A1 | 12/2014 |
| EP | 1 742 135 A1 | 1/2007 |

*Primary Examiner* — Chae M Ko
(74) *Attorney, Agent, or Firm* — Renner Kenner Greive Bobak Taylor & Weber

(57) ABSTRACT

A cyber physical system including at least one monitoring and safety device for monitoring various parameters of a machine with regard to the maintenance of setpoint values and for generating an error signal in the event of an error and a hard-wired interface to the Internet and a transmission and/or reception unit for transmitting and/or receiving data over the Internet, wherein the monitoring or safety device is connected to the transmission and/or reception unit for transmitting the error signal over the Internet. The hard-wired interface is connected to a controllable switch for physical disconnection and enabling of the connection between the cyber physical system and the Internet, and the cyber physical system has at least one control unit connected to the monitoring or control device for triggering the controllable switch for brief enabling of the connection between the cyber physical system and the Internet.

13 Claims, 1 Drawing Sheet

(56) References Cited

U.S. PATENT DOCUMENTS

| | | | |
|---|---|---|---|
| 2017/0050644 A1* | 2/2017 | List | B60W 50/14 |
| 2017/0126712 A1* | 5/2017 | Crabtree | H04L 63/1416 |
| 2017/0228277 A1* | 8/2017 | Cheng | G06F 11/0709 |
| 2017/0305368 A1* | 10/2017 | Markham | B60R 16/0231 |
| 2017/0346644 A1* | 11/2017 | Cambou | H04L 9/3278 |

* cited by examiner

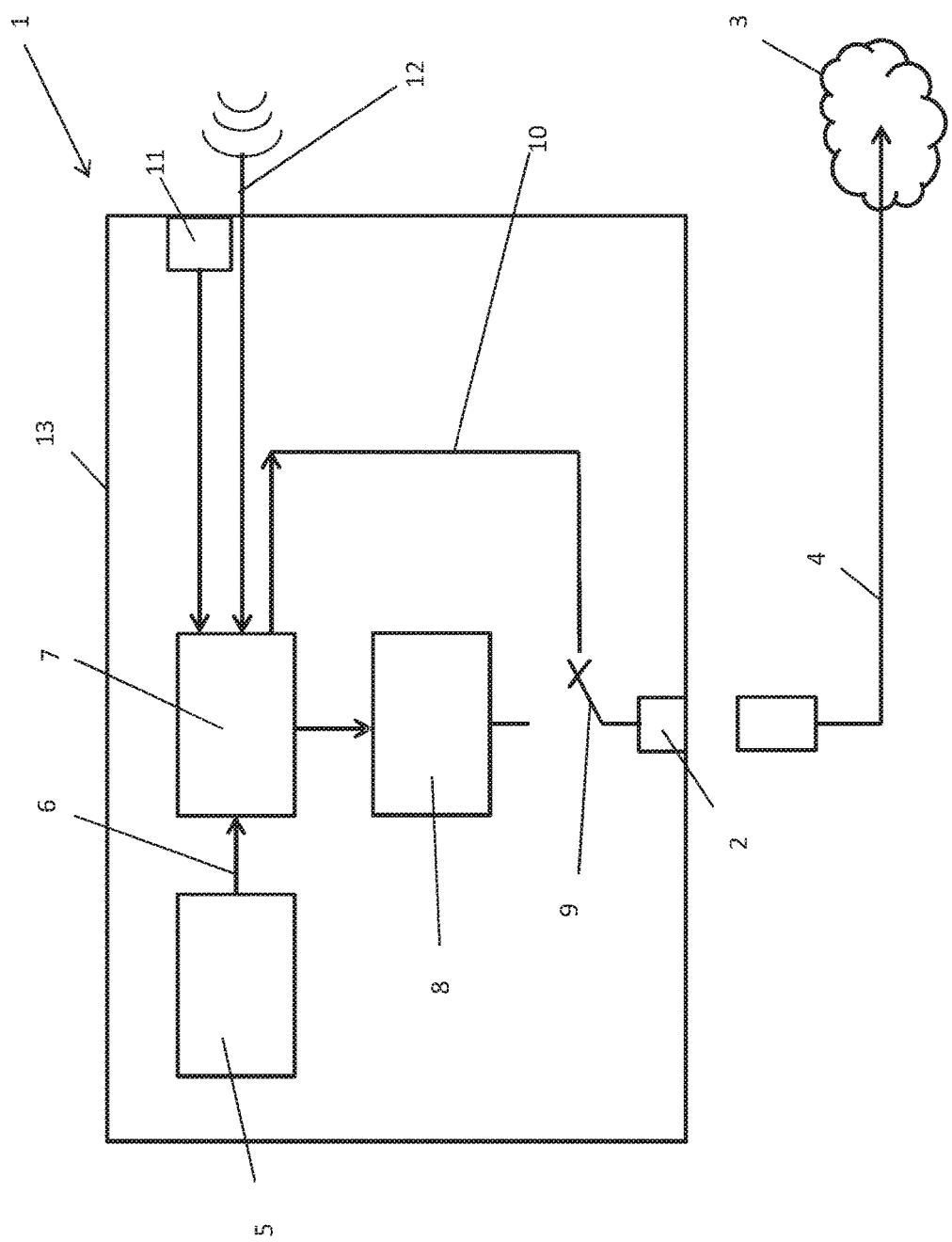

CYBER PHYSICAL SYSTEM

TECHNICAL FIELD

The invention relates to a cyber physical system with a hard-wired interface to the Internet and a transmission and/or reception unit for transmitting and/or receiving data over the Internet.

BACKGROUND

A cyber physical system is understood to be a network of informational software components with mechanical and electronic components connected to the Internet.

It is customary in industrial plants for the individual units that are used to be connected to a control station, from which the processes taking place can be controlled. Any error messages of the units being monitored also converge in the control station. With smaller systems or machines not connected to a control station, any error signals are displayed on the machines themselves or on a respective control box. In many cases there is also the option of forwarding these errors to authorized persons over the Internet. However, an Internet connection always also entails the risk of hacker attacks or undesired manipulations. Software security systems such as firewalls or a high level of encryption frequently do not offer adequate security today.

US 2010/0299720 A1 discloses a method and a device for connecting and disconnecting a computer to/from the Internet, in which a switch provided in the Internet connection cable is actuated via an activation mechanism. In addition, measures to maintain IT security by means of authentication and security tokens are used in DE 10 2013 105 781 A1.

EP 1 742 135 A1 describes a safety system for a data processing system with a data connection for connecting an internal data processing system to an external data network and an inspection device for inspecting the data exchanged over the data link. Unauthorized access from an external data network to the internal data processing system as well as from the internal data processing system to the external data network can be suppressed by using a blocking device.

SUMMARY OF THE INVENTION

Therefore the object of the present invention is to improve upon the security of a cyber physical system from hacker attacks and undesired manipulations.

According to the invention this object is achieved with a cyber physical system which has at least one monitoring and security device for monitoring various parameters of a machine with regard to maintenance of setpoint values and for generating an error signal in the event of an error, a hard-wired interface to the Internet and a transmission and/or reception unit for transmitting and/or receiving data over the Internet, wherein the monitoring or security device is connected to the transmission and/or reception unit for transmitting the error signal over the Internet. The hard-wired interface is connected to a controllable switch for physically connecting and disconnecting the connection between the cyber physical system and the Internet, and the cyber physical system has at least one control device connected to the monitoring or security device for triggering the controllable switch for short-term enabling of the connection between the cyber physical system and the Internet.

The cyber physical system can be disconnected from the Internet completely and absolutely securely during normal operation by means of the controllable switch. Only when an event occurs is the controllable switch connected to the Internet by the control unit in the sense of enabling the connection. Therefore, the connection is enabled only for the purpose of transmission and/or reception of data and is therefore lasts for only a very short time, in particular shorter than one minute, preferably shorter than 30 seconds.

The cyber physical system is therefore visible on the Internet only for the brief instant of enabling, so that hacker attacks or undesired manipulation is made extremely difficult.

In addition the object defined above is achieved by a method for operating a cyber physical system, in which at least one monitoring and security device monitors various parameters of a machine with regard to the maintenance of setpoint values and generates an error signal in the event of an error and transmits and/or receives data over a hard-wired interface to the Internet, wherein the hard-wired interface between the cyber physical system and the Internet is disconnected physically by a controllable switch and is enabled only briefly for transmitting and/or receiving data and wherein the hard-wired interface between the cyber physical system and the Internet is enabled briefly for transmitting the error signal via the controllable switch.

The cyber physical system may be, for example, a programmable controller, a regulator, a motor safety relay, a pump, a compressor, a packaging machine or the like.

Advantageous embodiments of the invention are the subject matter of the additional claims.

The interface is expediently formed by an RJ45 bush. The controllable circuit may also be provided as a relay in particular.

According to a preferred embodiment of the invention, the monitoring and security devices, the control unit, the transmission and/or reception unit and the controllable switch are accommodated in a common housing. The hard-wired interface may be provided in the common housing.

The controllable switch can be triggered by an operator on site, by internal triggering or via an independent external channel, for example, via a mobile cellular connection. In addition, it is possible to provide that the controllable switch is enabled in a predefined time window so that monitoring and/or maintenance jobs can be carried out. However, it is also conceivable for the controllable switch to be enabled only when a predefined event occurs (error signal, power outage, . . . ). The monitoring and security device may be, for example, a system that checks on various parameters of a motor and monitors them with regard to maintenance of setpoint values. For example, if the current or voltage values measured are too high or if excessively high temperatures are detected, the monitoring or security device will generate an error signal, which goes via the transmission unit onto the Internet, where it can be retrieved.

BRIEF DESCRIPTION OF THE DRAWING

FIG. 1 shows a schematic diagram of the cyber physical system 1 which is connected to the Internet 3 via a hard-wired interface 2 formed by an RJ45 bush, for example. This connection is accomplished, for example, by inserting a network cable 4, which is part of a network connected to the Internet 3.

DETAILED DESCRIPTION

The cyber physical system 1 also has a transmission and/or reception unit 8 for transmitting and/or receiving data over the Internet, wherein the connection between the transmission unit 8 and the hard-wired interface 2 is physically disconnected by a controllable switch 9 during normal operation of the cyber physical system. However, the controllable switch 9 can be controlled by a control unit 7 over an Internet line 10 in the sense of closing the controllable switch and thus in the sense of enabling the connection between the cyber physical system 1 and the Internet 3. It is thus possible to provide in particular that the connection is enabled by a certain event, for example, in a predefined time window for monitoring and/or maintenance work. However, it is also conceivable for enabling to be triggered by an operating on site in particular by means of an input device 11 or by means of an external channel 12, in particular by means of a mobile cellular connection.

After the transmission operation, the connection to the Internet is disconnected again by opening the controllable switch 9. The cyber physical system 1 is thus visible only for the brief moment of transmitting or receiving data via the Internet.

Due to the controllable switch, which enables physical disconnection of the connection to the Internet, it is possible to ensure 100% protection in the phase during which the switch is opened, i.e., the connection to the Internet is physically disconnected. Furthermore, the controllable switch makes it possible to keep Internet connections as brief as possible, which makes any hacker attacks or undesired manipulations extremely difficult.

According to an optional embodiment of the invention, the cyber physical system may also have at least one monitoring or safety device 5 which monitors at least one parameter of the cyber physical system, for example, the current, voltage or temperature values, and generates an error signal 6 when an error occurs. This error signal 6 is then forwarded, for the purpose of transmission of the error signal, from the control unit 7 to the transmission and/or reception unit 8, which is designed as a transmission unit. In the case of an error signal 6, the control unit 7 closes the controllable switch 9 and sends the command for transmitting the error signal 6 over the interface 2 to the Internet 3 to the transmission and reception unit 8.

The invention claimed is:

1. A cyber physical system comprising
   at least one monitoring and safety device for monitoring various parameters of a machine with regard to the maintenance of setpoint values and for generating an error signal in the event of an error and a hard-wired interface to the Internet and
   a transmission and/or reception unit for transmitting and/or receiving data over the Internet, wherein the monitoring and safety device is connected to the transmission and/or reception unit for transmitting the error signal over the Internet,
   characterized in that the hard-wired interface is connected to a controllable switch for physical disconnection and enabling of the connection between the cyber physical system and the Internet, and the cyber physical system has at least one control unit connected to the monitoring and safety device for triggering the controllable switch for brief enabling of the connection between the cyber physical system and the Internet.

2. The cyber physical system according to claim 1, characterized in that the monitoring and safety device, the control unit, the transmission and/or reception unit and the controllable switch are accommodated in a common housing.

3. The cyber physical system according to claim 1, characterized in that the hard-wired interface is accommodated in a common housing.

4. The cyber physical system according to claim 1, characterized in that the controllable switch is connected to the control unit via an Internet line.

5. The cyber physical system according to claim 1, characterized in that the hard-wired interface is formed by an RJ45 bush.

6. The cyber physical system according to claim 1, characterized in that the controllable switch is formed by a relay.

7. The cyber physical system according to claim 1, characterized in that the controllable switch is triggerable via an external channel.

8. The cyber physical system according to claim 1, characterized in that the controllable switch is triggerable by an operating on site.

9. A method for operating a cyber physical system in which at least one monitoring and safety device monitors various parameters of a machine with regard to the maintenance of setpoint values and in the event of an error, generates an error signal and data is transmitted and/or received over a hard-wired interface to the Internet,
   characterized in that the hard-wired interface between the cyber physical system and the Internet is disconnected physically by a controllable switch and is enabled only briefly for transmitting and/or receiving data, and wherein in the case of an error signal, the hard-wired interface between the cyber physical system and the Internet is enabled briefly for transmitting the error signal by means of the controllable switch.

10. The method according to claim 9, characterized in that the controllable switch is enabled in a predefined time window.

11. The method according to claim 9, characterized in that the controllable switch is enabled on occurrence of a predefined event.

12. The method according to claim 9, characterized in that there is the option that the controllable switch is triggered by an operator on site for transmitting or receiving data.

13. The method according to claim 9, characterized in that there is the option that the controllable switch is triggered by an external channel for transmitting or receiving data.

* * * * *